(12) United States Patent
Dean

(10) Patent No.: US 6,296,146 B2
(45) Date of Patent: *Oct. 2, 2001

(54) FLUENT PRODUCT DISPENSER WITH TEMPERATURE INDICATING MEANS

(75) Inventor: Michael Dean, Alpharetta, GA (US)

(73) Assignee: Flexible Products Company, Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/740,331

(22) Filed: Dec. 18, 2000

Related U.S. Application Data

(63) Continuation of application No. 09/304,387, filed on May 4, 1999, now Pat. No. 6,161,725.

(51) Int. Cl.$^7$ ............................................ B67D 5/06
(52) U.S. Cl. .......................... 222/25; 222/135; 222/183
(58) Field of Search ............................ 222/54, 25, 23, 222/146.3, 183, 135; 116/216

(56) References Cited

U.S. PATENT DOCUMENTS

| | | |
|---|---|---|
| 2,319,101 | 5/1943 | Anderson ............................ 374/150 |
| 3,128,995 | 4/1964 | Shaeffer . |
| 3,629,552 | 12/1971 | Edging . |
| 3,864,976 | 2/1975 | Parker . |
| 3,933,276 | 1/1976 | Packham et al. ................. 222/146.5 |
| 4,028,287 | 6/1977 | Sato et al. . |
| 4,149,806 | 4/1979 | Venable . |
| 4,154,107 | 5/1979 | Giezen et al. . |
| 4,204,612 | 5/1980 | Schrader et al. . |
| 4,302,971 | 12/1981 | Luk . |
| 4,430,446 | 2/1984 | Lynn . |
| 4,828,325 | 5/1989 | Brooks . |
| 4,878,588 | 11/1989 | Ephraim ............................. 215/11.2 |
| 5,304,003 | 4/1994 | Winninger ............................ 374/150 |
| 5,325,994 | 7/1994 | Mizialko et al. . |
| 5,344,051 | 9/1994 | Brown . |
| 5,645,196 | 7/1997 | Hancuff . |
| 6,161,725 | * 12/2000 | Dean ..................................... 222/23 |

FOREIGN PATENT DOCUMENTS

895945a1    2/1999   (EP) .

OTHER PUBLICATIONS

"Hi-Prene Foam & Hi-Prene Handy Foam" Mitsui Toatso Chemicals, Inc. Jul. 1996.

Cole-Parmer Instrument Company, Catalog 1994 Niles, Illinois—"Irreversible Temperature Indicators" pp. 1282–1283.

* cited by examiner

Primary Examiner—Kevin Shaver
Assistant Examiner—Patrick Buechner
(74) Attorney, Agent, or Firm—Vedder Price Kaufman & Kammholz

(57) ABSTRACT

An improved fluent product dispensing apparatus is disclosed and includes a temperature indicator so that the user may view the temperature of the fluent product components prior to and during dispensing. The apparatus includes one or more supply containers of a reactive component, a dispenser and a conduit for conveying the reactive components to the dispenser. One or more of the supply containers has a temperature indicator mounted to its exterior that is viewable through a package, or carton, that encloses the supply containers. This indicator displays the temperature of the contents of the supply container so that a user can ensure proper dispensing of the reactive components.

16 Claims, 4 Drawing Sheets

FLUENT PRODUCT DISPENSER WITH TEMPERATURE INDICATING MEANS

This application is a continuation of prior application Ser. No. 09/304,387, filed May 4, 1999, now U.S. Pat. No. 6,161,725.

BACKGROUND OF THE INVENTION

The present invention relates generally to fluent product dispensers, and more particularly to fluent product dispensers having temperature-indicating means for indicating the temperature of the products.

There exist many fluent product dispensers in the marketplace. Some dispensers are well known and are used to dispense amounts of expandable one-component urethane foams, such as GREAT STUFF, manufactured and sold by Flexible Products Company of Joliet, Ill., the assignee of the present invention. Other fluent product dispensers are used to first mix, and then dispense two foam components that are reacted with each other within the dispenser. Once mixed together, the two components combine and expand to form an expansive foam. This reacted foam may be used in adhesive applications, in caulking applications, in sealing applications or the like.

The use of such two reactive components is often temperature dependent. There is an optimum temperature for operation of the two foam components. Below this optimum temperature (of one or both of the two foam reactive components), the quality of the reacted foam suffers, such as a much lower foam yield occurring from the reaction. In the actual field use of these foam components, the product packaging or literature that accompanies the dispenser may typically indicate that the foam should be dispensed when the temperature of one or more of the foam reactive components is above a certain temperature, such as 75° F. Some instructions recommend that the containers be placed in a warm environment for 48 hours or more so that the contents will rise to 75° or above. Despite these cautionary instructions, conventional two foam component fluent dispensers have no means to determine the temperature of the contents of foam component containers.

Many users do not fully acclimate the containers, perhaps out of a mistaken belief that the containers warm more quickly than they actually do. Users also become impatient with the time needed for complete acclimation and operate the dispensers when the components are colder than they should be. Resulting foam yields will be small leading to inefficiency and the foam components may not completely react with each other, affecting the quality of the foam produced.

A need therefore exists for means to readily indicate to the user the temperature of the contents of the foam components so as to ensure the proper dispensing of the foam components.

SUMMARY OF THE INVENTION

Accordingly, it is a general object of the present invention to provide a means for readily indicating the temperature of the foam components from the exterior of the supply containers for the reactive foam components.

Another object of the present invention is to provide a fluent product dispensing apparatus having a dispenser, supply containers of reactive foam components, a conduit for conveying the foam components to the dispenser and a means for indicating the temperature of the foam components that is fixed to at least one of the supply containers, which can be easily and readily read by a user.

A further object of the present invention is to provide a foam dispensing assembly having a manually operated foam dispenser, a pair of foam component supply containers, each container having a predetermined amount of foam component therein, a pair of supply tubes for connecting the supply containers and the dispenser together, a temperature indicator operatively associated with at least one of the supply containers having a display indicating a range of temperatures of the foam components held in the supply containers, the display being easily readable by a user so as to determine when the foam components may be properly dispensed in accordance with the foam application instructions.

In one principal aspect of the present invention, the entire dispensing apparatus is contained in a carton as a unit. The carton contains two foam component supply canisters and an actuating assembly in the form of two foam component supply tubes, each having a preselected length which is sufficient to permit a dispensing assembly attached to the supply tubes to be operated remotely from the carton while interconnected thereto. The material supply tubes, dispensing assembly and one or more detachable dispensing nozzles are positioned within a predesignated area within the carton so that the apparatus may be sold as a single unit. The carton not only may function as a carrier assembly for the dispensing apparatus, but also may function as a shipping container therefor.

In another principal aspect of the present invention, the dispensing apparatus includes a carrier which holds two foam component supply canisters in place and incorporates an actuating/handle assembly to ensure simultaneous release of the two foam components from their respective supply canisters through foam component supply tubes. The tubes extend to a foam dispenser which includes a dispensing nozzle. The dispenser detachably engages the carrier so that it may be detached and remotely operated away from the supply canisters adjacent a workplace such that it is easily operated with one or two hands. The carrier is capable of holding the supply canisters in place in either an upright or inverted orientation.

Still a further object of the present invention is to provide such a foam dispensing assembly wherein the temperature indicator is mounted to the supply container and the supply containers being enclosed within a carton, the carton having an opening in registration with the temperature indicator so that the temperature indicator may be read from exterior of the carton, the temperature indicator being affixed to the supply container and including a liquid crystal display.

Yet another object of the present invention is to provide a foam component supply container having a predetermined amount of foam component contained therein with an associated temperature indicator, the temperature indicator being mounted on the exterior of the supply container and having a heat-activated portion that indicates the general temperature of the contents of the supply container.

Yet still another object of the present invention is to provide a temperature indicator for use with a pressurized reactive foam component supply container that is affixed to the exterior of the supply container in a location to indicate the temperature of the reactive foam component other than the pressurizing medium, the temperature indicator having at least a line of temperature demarcation that indicates both acceptable and unacceptable application temperatures for the reactive foam component.

The present invention accomplishes these objects by providing, in one principal aspect of the invention, a thermosensitive temperature indicator, preferably in the form of a flat, layered indicator that incorporates a layer of a liquid crystal display substance that changes color in response to temperature changes. The liquid crystal display indicator has, in one embodiment thereof, a pressure-sensitive backing so that it may be applied directly to one of the two supply containers.

In another principal aspect of the present invention, the temperature indicator, in one embodiment thereof, includes visual indicia formed thereon in the form of a range of temperatures arranged in ascending order so as to facilitate the reading thereof by the user of the apparatus. In another embodiment, the temperature indicator may include a line of demarcation that divides the temperature range into two portions, one portion having a temperature responsiveness to temperature below the recommended minimum application temperature of the foam components and the other portion having a temperature responsiveness to temperatures equal to or above the recommended minimum application temperature of the foam components.

In another principal aspect of the present invention, the foam dispensing apparatus includes two foam component supply containers, an actuating assembly, two foam component supply tubes of a preselected length which is sufficient to permit a dispensing assembly attached to the supply tubes to be operated remotely from the supply containers and a manually operable foam dispenser. One or both of the foam components supply containers may include a temperature indicator as described above affixed to its exterior surface. The foam component supply containers and the actuating assembly are contained within a carrier assembly that permits the supply containers to be held by a user with one hand, while the user may hold and actuate the foam dispenser with the other hand.

In yet another principal aspect of the present invention and as exemplified by one embodiment thereof, the carrier assembly includes a carton that substantially encloses the two supply containers and actuating assembly. The carton may have a window formed in one of its sidewalls in registration with the temperature indicator so that the temperature indicator may be read from the outside without the need for opening the carton and removing the supply containers. The window may be slightly larger than the temperature indicator or it may be a larger size window to permit viewing of the other components of the apparatus.

The carrier assembly in an alternate embodiment, includes a carrier member that holds two foam component supply containers and incorporates a handle into an actuating assembly formed as part of the carrier assembly. No window is required in this embodiment because it has no carton that serves as both a package and a carrier. The temperature indicator is fixed to one or both of the supply containers and is easily read by the user.

These and other objects, features and advantages of the present invention will be clearly understood through consideration of the following detailing descriptions.

DETAILED DESCRIPTION OF THE PREFERRED EMBODIMENTS

Figure 1:
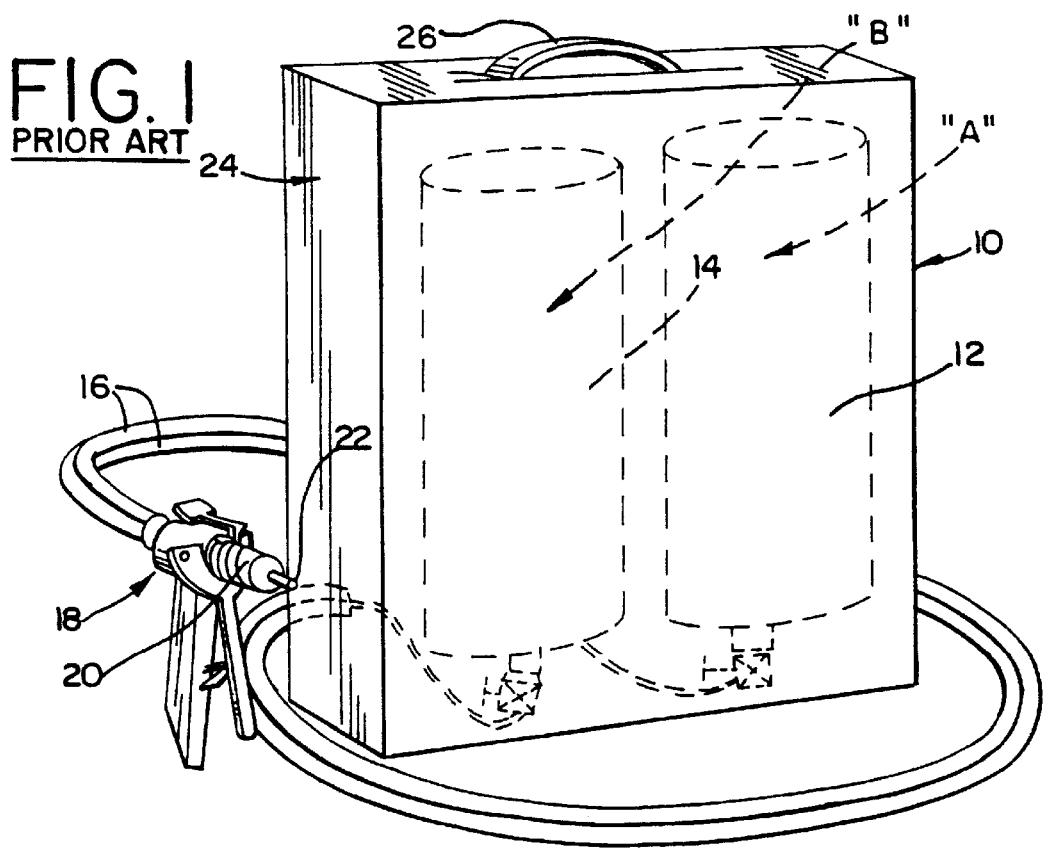
FIG. 1 is a perspective view of a known fluent product dispensing apparatus.

Referring now to FIG. 1, a known fluent product dispensing apparatus is illustrated generally at 10. The apparatus 10 is particularly suitable for the two-handed dispensing of a fluent product, such as an expandable foam that is formed by the reaction between two different reactive components.

The fluent products dispensed by the apparatus 10 are typically urethane and other expandable foams. Urethane foams in particular, are known for their compatibility with low-cost blowing agents that permit such foams to be applied by way of pressurized containers. The natural adhesive qualities of these foams also allow them to bond excellently to any number of substrates. Typically, such urethane foams are the reaction product of two different and individual components, one typically being a foaming agent and the other typically being a resin.

When reacted together, these components give the resultant foam various chemical compositions, with each such composition having significant utility in a particular application. These foams, and particularly urethane foams may be specially formulated to provide a final foam which is rigid, flexible, semi-rigid or the like. The foams produced may also be either open cell or closed cell in structure, with the former having particular utility in packaging and non-insulating applications and with the latter having particular utility in building and structural insulation applications. The reactive components for urethane foams typically include a foaming agent and a resin, each such component being separately contained within a respective foam component supply container 12, 14.

A dispenser is provided to dispense the foam and it is connected to the foam component supply containers by way of tubes or other conduits, such as the hoses 16 illustrated. The hoses 16 serve to convey each from component to dispenser 18 where they are mixed together, preferably in a disposable nozzle body portion 20 of the dispenser 18, prior to exiting the dispenser 18 under pressure through a nozzle opening 22.

The supply containers 12, 14 and the other components may be enclosed within a carton 24 that may have a handle 26 or the like formed thereon that facilitates the handling of the overall apparatus 10. The hoses 16 exit the carton 24 through an opening (not shown) and connect to the dispenser 18. As mentioned above, problems arise with the use of such dispensing apparatus in that the foam components have a range of optimum temperatures for application. Although the carton 24 or the containers 12, 14 themselves may contain directions as to the proper application temperature for the components, many users have no idea when the components are at their proper application temperature. Users may grow impatient with a need to acclimatize the components.

Figure 2A:
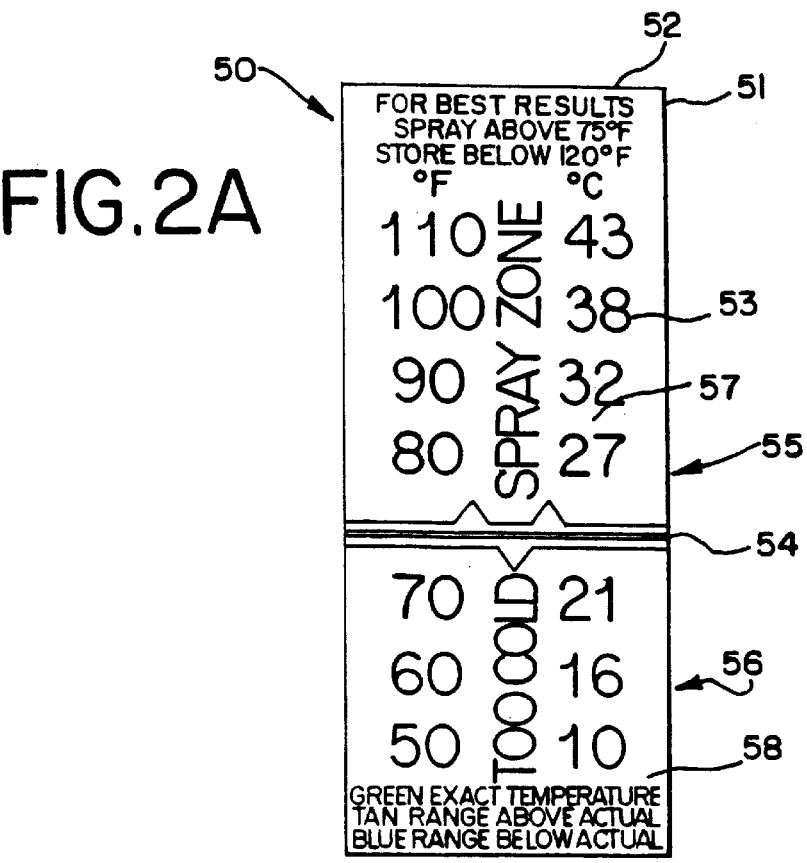
FIG. 2A is an elevational view of one style of a temperature indicator for use with a fluent product dispenser in accordance with the principles of the present invention.
Figure 2B:
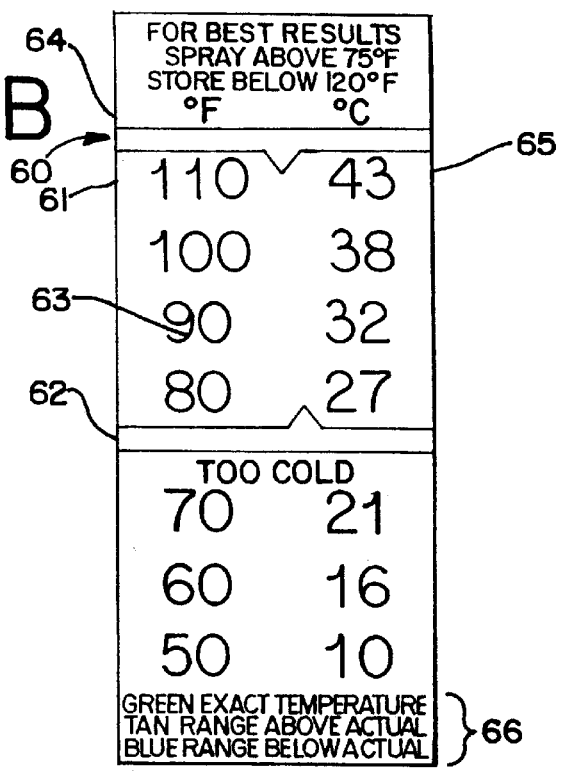
FIG. 2B is a similar view of another style of temperature indicator for use with a fluent product dispenser in accordance with the principles of the present invention.
Figure 2C:
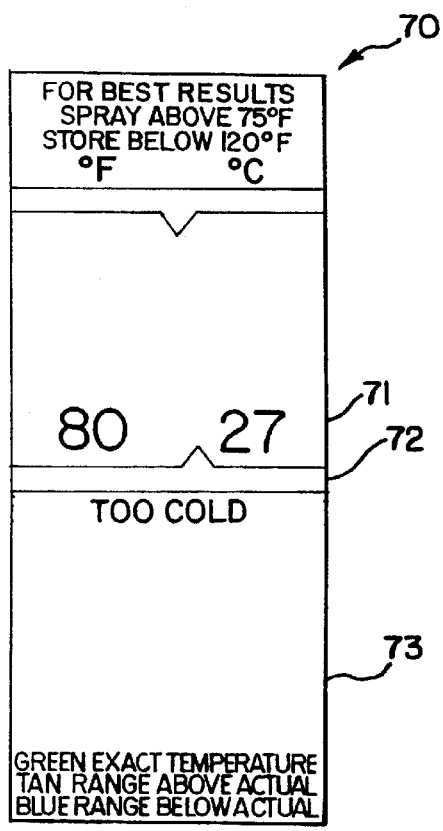
FIG. 2C is a similar view of another style of temperature indicator for use with a fluent product dispenser in accordance with the principles of the present invention.

The present invention provides a solution to this problem, by providing a unique temperature indicating means. Such indicating means are shown in FIGS. 2A through 2C. FIG. 2A illustrates one such indicating means 50 that comprises a flat strip having a front face 51 and an opposing rear face 52 that preferably supports a layer of adhesive (not shown). The front face 51 of the indicator 50 has a series of temperature markings in the form of numerals 53 disposed thereon in ascending order, and each such numeral corresponds to a particular temperature.

These temperature numerals 53 may be separated, as shown, at a chosen point by a line of demarcation 54 that divides the temperature range into two portions 55, 56. The first of these two portions 55 may include temperatures that are equal to or are above the minimum application temperature for the foam components and thus indicate to the user that the foam components may be properly reacted and dispensed as a foam. The second of these two portions 56 may include temperatures that are below the minimum application temperature for the foam components and thus indicate to the user that the foam components, if reacted, shall not dispense a foam with expected quality and yields. It will be understood that at such temperatures, foam application may still occur, but at lower yields and quality. Additional markings 57, 58 may be included as part of the visual indicia that indicate, in the form of text, such as by "SPRAY ZONE" 57 and "TOO COLD" 58, the proper and improper dispensing temperatures.

FIG. 2B illustrates another style of temperature indicator 60 that is also easily affixed, by way of an adhesive backing (not shown) to a foam component supply container. In this style indicator 60, the visual indicia 61 is arranged at the line of demarcation 62 and indicates the temperature range in numerals 63 in both the Fahrenheit and Celsius temperature scales 64, 65. The range of proper foam components dispensing temperatures may be bracketed by markings, shown as bars 66, of a contrasting color.

FIG. 2C illustrates yet another style of temperature indicator 70, also with an adhesive backing (not shown) that may be fixed to a foam component supply container. This style indicator has only minimum visual indicia, that indicate only the threshold application temperature 71 and line of demarcation 72 on that front face 73 of the indicator 70.

In all of the aforementioned indicators, 50, 60, 70, a layer having a liquid crystal display (LCD) is incorporated into the indicator. As is known in the art, this LCD type material is a compound that produces a visible color change in response to a temperature activation. When activated, the temperature sensitive substance emits or reflects visible light radiation to indicate temperature. The color sequence of normal temperature activation may be structured to present tan, red, green, blue and ultraviolet. The colors may be filtered to obtain a desired color sequence. Alternatively, a thermochromic strip may also be employed that is tailored to respond by color change along its length in a predetermined fashion in response to temperature changes.

The LCD material on the temperature indicator that is in contact with the exterior surface of the supply containers 81, 82 may possess the ability to change from among many different preselected colors to indicate the temperature of the material in contact with it, i.e., the contents of the supply containers 81, 82. For example, it may adopt a green color where the temperature of the component is exactly the temperature shown by the number on the indicator, and it may also adopt, for example, a tan color where the temperature range of the supply component is above the actual temperature.

It will be understood that such temperature indicators of the invention may not utilize the line of demarcation and may only utilize a single temperature marking such as the proper application temperature, a text marking such as "GOOD" or the like.

Figure 3:
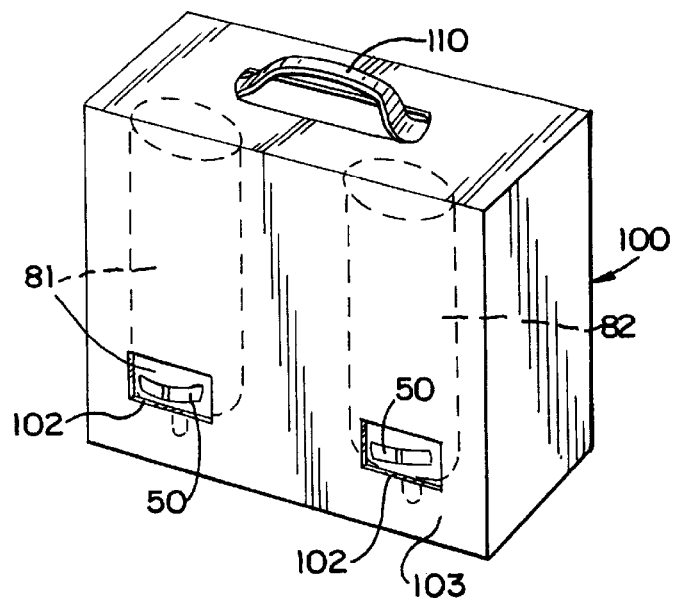
FIG. 3 is a perspective view of a fluent product dispensing assembly in the form of a kit and constructed in accordance with the principles of the present invention.
Figure 4:
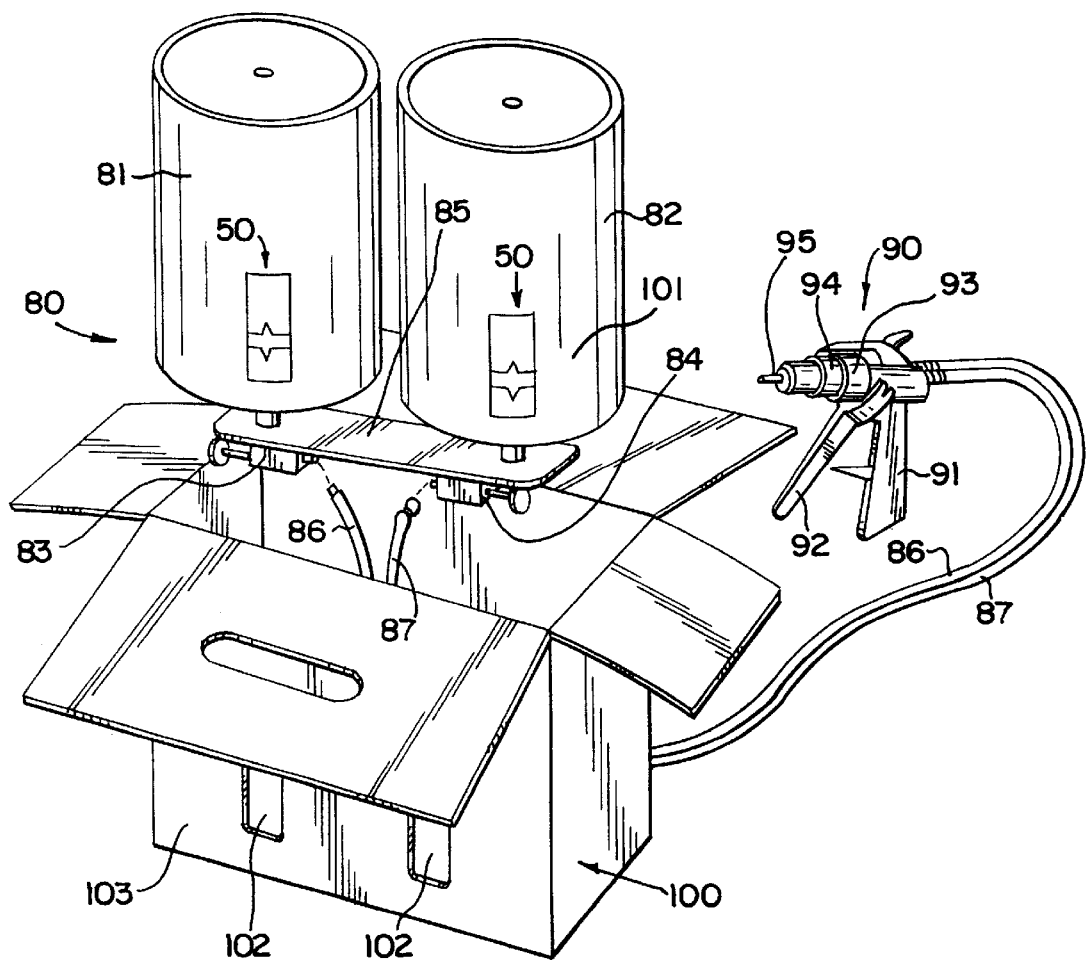
FIG. 4 is an exploded view of the assembly of FIG. 3, illustrating the components associated therewith.

Referring now to FIGS. 3 and 4, one embodiment of an improved foam dispensing apparatus 80 constructed in accordance with the principles of the present invention is shown. The apparatus 80 is particularly suitable for the two-handed dispensing of multi-component fluent materials, such as polyurethane foams and the like. The apparatus 80 includes a pair of distinct, vertically arranged foam supply canisters 81, 82 which contain the foam supply components which, when mixed and reacted together form a foam. These separate containers 81, 81 store the liquid foam components of the foam, preferably in a pressurized state, one of the two components typically being an isocyanate component and the other component typically being a liquid resin solution.

In this embodiment, the foam component supply containers 81, 82 are held by a carrier, in the form of a carton 100 in an inverted orientation, and each supply container 81, 82 may include a valve 83, 84 operatively associated therewith for releasing the reactive components out of the supply containers 81, 82 under pressure. The supply containers 81, 82 may be interconnected together near their valves 83, 84 by a yoke 85 that maintains the position of the supply containers 81, 82 in the carton 100. Two supply hoses, or tubes 86, 87 attach to the supply container valves 83, 84 and exit from the carton 80 through an opening (not shown) to mate with a dispenser 90.

The dispenser 90 shown takes the form of a gun-style dispenser having a handle 91 with an actuatable trigger 92 that opens two ports to permit the reactive components to pass into a barrel portion 93 that includes a hollow mixing chamber (not shown). The dispenser 90 also typically includes either a fixed or replaceable dispensing nozzle 94 with a dispensing tip 95.

The temperature indicators 50 may be adhesively affixed to the exterior surfaces 101 of one or both of the supply containers 81, 82. In order to facilitate the reading of the visual indicia of the temperature indicator 50, the carton 100 may be provided with one or more windows 102 formed in a sidewall 103 thereof. The carton 100 may also include a handle assembly 110 that protrudes through the top of the carton 100 so that carton may be held by a user with one hand, while the dispenser 90 may be held with the other hand. Each window 102 is preferably slightly larger in size than the indicator(s) 50 so that a user may easily read all of the visual indicia on the temperature indicator 50. The window may also be of a larger size than shown to permit viewing from the exterior of the carton 100 of the supply containers 81, 82, their valves 83, 84 and other components of the apparatus 80.

Figure 5:
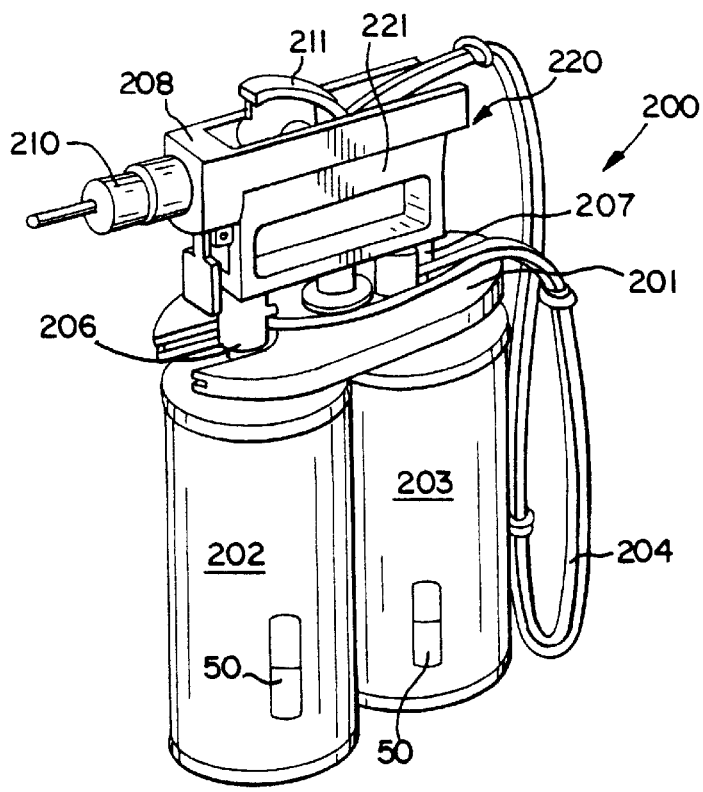
FIG. 5 is a perspective view of an alternative fluent product assembly utilizing a temperature-indicating means according to the invention; and, FIG. 6 is a perspective view of another alternative fluent product assembly according to the invention.

Whereas the supply containers 81, 82 of the embodiment illustrated in FIGS. 3 and 4 are shown in an inverted orientation, they may also be held in an upright orientation, as illustrated by the second embodiment of an apparatus 200 illustrated in FIG. 5. In this embodiment, the apparatus 200 includes a carrier 220 that includes a yoke member 201 that holds the two supply containers 202, 203 together in an upright orientation and a handle assembly 221 that is connected to the yoke member 201. Two supply tubes 204 lead from valves 206, 207 of the containers to a detachable dispenser 208, having a replaceable dispensing nozzle 210 and a cam actuator 211 that may be manipulated by a user's finger. More details on the construction of this type structure may be found in U.S. Pat. No. 5,344,051, owned by the assignee of the present invention, and the disclosure of which is hereby incorporated herein by reference. One or more of the supply containers 202, 203 may have a temperature indicator 50 applied to their exterior surface.

Figure 6:
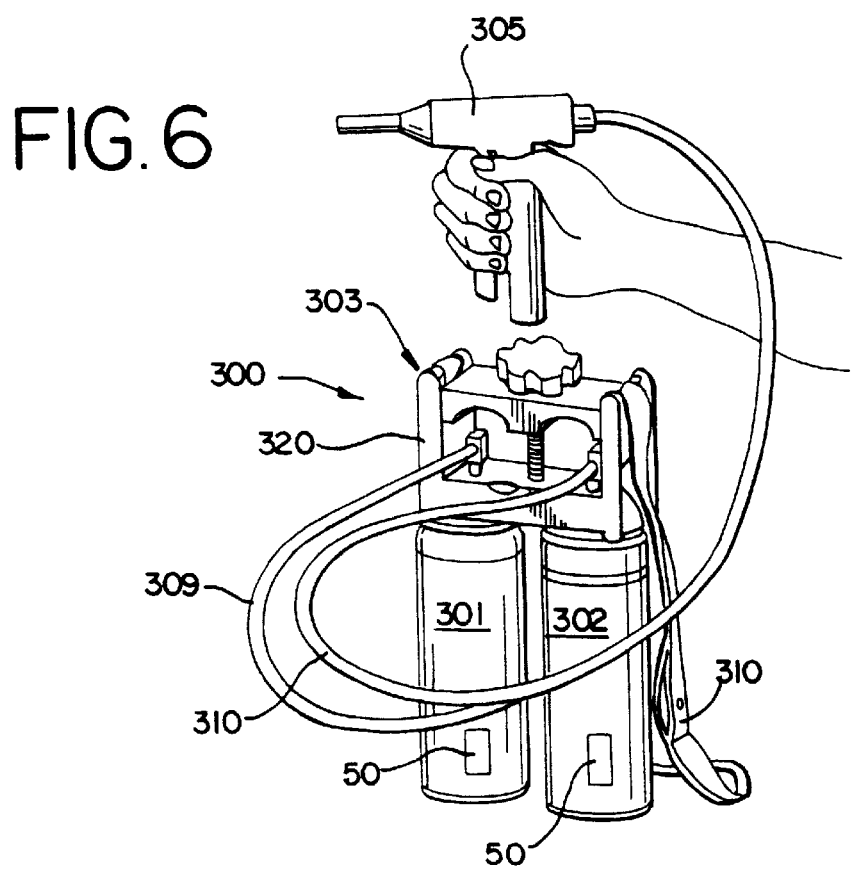

A third embodiment of a dispensing apparatus 300 constructed in accordance with the present invention is illustrated in FIG. 6. In this apparatus 300, the two supply containers 301, 302 are held in an upright position by means of a carrier 303 having a handle portion 320, and the dispenser 305 takes the form of a hand-held gun dispenser, similar to that shown in FIGS. 3 and 4. Two supply tubes 309, 310 lead from the supply containers 301, 302 to the dispenser 305. The carrier 303 that holds the supply containers 301, 302 in place may have a shoulder strap 310 that permits a user to sling the dispenser over his shoulder during use. Temperature indicators are located on the exterior surface of the supply containers 301, 302.

Although described above in terms of two container assemblies, it will be understood that the present invention also finds application in association with a single reactive foam component supply container, regardless of the size of the container. In this instance, the indicator is also affixed to the exterior of the supply container as shown in any of the Figures and will indicate to a user whether or not the foam component, when used, shall meet the user's expectations. Such a single supply container may be incorporated with a carrier assembly for a dispensing apparatus as shown, or the supply container may be one that can be used later with such a dispensing apparatus.

While the preferred embodiments of the invention have been shown and described, it will be apparent to those skilled in the art that the embodiments are merely illustrative of some applications of the principles of the present invention and that changes and modifications may be made therein without departing from the spirit of the invention, the scope of which is defined by the appended claims.

I claim:

1. A unit for dispensing a multi-component foam from pressurized containers with a temperature sensing and display means incorporated therewith, comprising: two supply containers, each of the containers containing at least one component of the multi-component foam; a carrier in the form of a carton for holding said supply containers together as a unit, the carrier having a plurality of sidewalls and endwalls that are foldable along foldlines to form a carton for enclosing said supply containers and for holding said supply containers in a preselected orientation for foam dispensing, a foam dispensing member interconnected to said supply containers by a pair of elongated supply tubes, and two foam component temperature indicator adhesively attached to respective exterior surfaces of said supply containers, each of the temperature indicators including visual indicia that selectively indicates the temperature of the foam component within said supply container, said carton further including a pair of openings formed in sidewalls thereof in alignment with said temperature indicators, through which each said temperature indicator is visible so that each said temperature indicator visual indicia is readable from exterior of said carrier.

2. The unit as claimed in claim 1, wherein said visual indicia includes a temperature-sensitive liquid crystal display that changes color in response to a change in temperature of said foam components contained within said supply containers.

3. The unit as claimed in claim 1 wherein said visual indicia includes a line of demarcation separating one part of said temperature range from another part thereof, said line of demarcation coinciding with a predetermined application temperature of said foam components.

4. The unit as claimed in claim 1, wherein said visual indicia includes text material printed on said temperature indicators that identifies to a user a series of temperatures which equal or exceed a minimum application temperature of said foam components.

5. The unit as claimed in claim 1, wherein each of said sidewall openings is slightly larger than said temperature indicators so as to permit said temperature indicators visual indicia to be easily read by a user.

6. The unit as claimed in claim 1, wherein said two openings are formed in a single sidewall of said carton.

7. The unit as claimed in claim 6, wherein said two openings are aligned with each other within said carton single sidewall.

8. A unit for dispensing a multi-component foam from two pressurized containers, each of the containers containing at least one component of the multi-component foam, the unit comprising: a carrier having a plurality of sidewalls, the carrier holding said two containers in a preselected orientation for foam dispensing, a foam dispensing member interconnected to said two containers by a pair of elongated supply tubes, and a foam component temperature indicator adhesively attached to an exterior surface of at least one of said two containers, the temperature indicator including visual indicia that selectively indicates the temperature of the foam component within said one container, said carrier enclosing said two containers and at least one of said carrier sidewalls having a window formed therein in a location aligned with said temperature indicator, through which said temperature indicator is visible so that said visual indicia is readable from exterior of said carrier.

9. The unit of claim 8, wherein said window is slightly larger than said temperature indicator.

10. The unit of claim 8, wherein said temperature indicator includes a temperature-sensitive liquid crystal display that changes color in response to increasing temperature.

11. The unit of claim 10, wherein said temperature indicator is adhesively attached to said one container.

12. The unit of claim 8, further including a second foam component temperature indicator disposed on the exterior surface of the other of said two containers, the second temperature indicator also including visual indicia that selectively indicates the temperature of the foam component within said other container, said visual indica also being readable from exterior of said carrier.

13. The unit of claim 12, wherein said carrier encloses said two containers and includes an additional window formed in a sidewall thereof through which said temperature indicator and said second temperature indicator is visible.

14. The unit of claim 8, wherein said temperature indicator visual indicia includes a plurality of distinct temperatures that cooperatively define a range of temperatures.

15. The unit of claim 14, wherein said visual indicia includes a line of demarcation separating one part of said temperature range from another part thereof, said line of demarcation coinciding with a predetermined minimum application temperature of said foam components.

16. The unit of claim 14, wherein said visual indicia includes text materials identifying to a user of a series of temperatures which equal or exceed a minimum application temperature of said foam components.

* * * * *